United States Patent Office 3,438,242
Patented Apr. 15, 1969

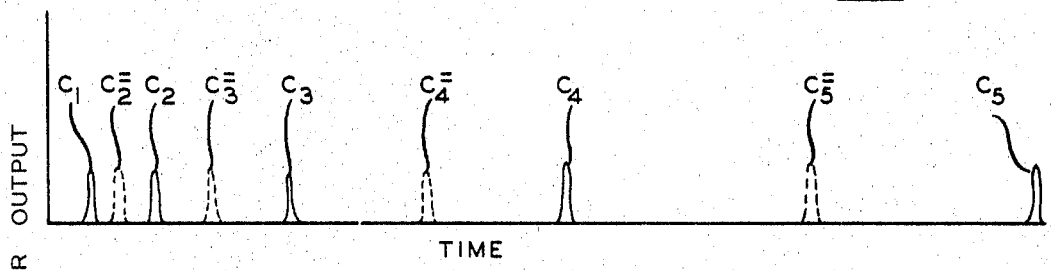
FIG. 2
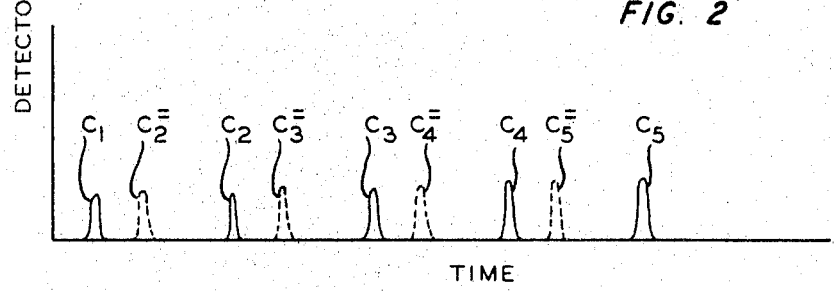
FIG. 3
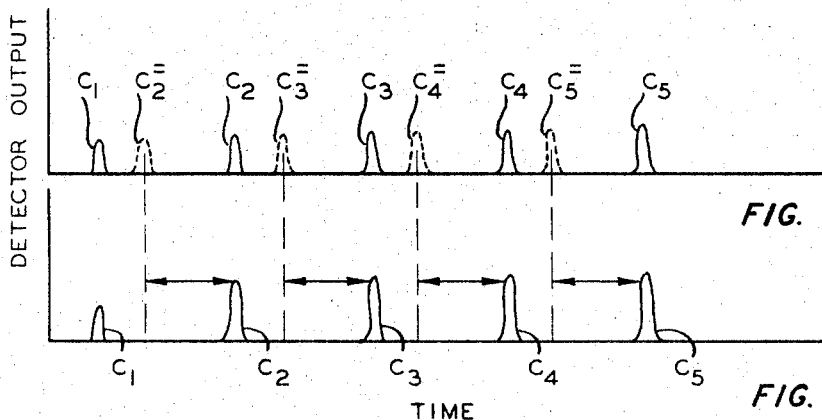
FIG. 4a
FIG. 4b

3,438,242
IDENTIFICATION OF CHROMATOGRAPHIC PEAKS
Buell O. Ayers and Richard A. Sanford, Bartlesville, Okla., assignors to Phillips Petroleum Company, a corporation of Delaware
Filed Sept. 20, 1965, Ser. No. 488,392
Int. Cl. G01n 31/08, 27/62, 29/02
U.S. Cl. 73—23.1                 3 Claims

ABSTRACT OF THE DISCLOSURE

Organic constituents in a mixture are analyzed by passing a sample of the mixture to a conversion zone which converts constituents of the mixture into consecutive members of the same homologous series. At least a portion of the effluent from the conversion zone is passed through a chromatographic column, and a property of the effluent from the chromatographic column which indicates the concentration of the individual members of the homologous series is measured and is recorded on a recording chart as equally spaced chromatographic peaks representative of the consecutive members of the homologous series.

This invention relates to an improved chromatographic method and apparatus therefor. In another aspect, this invention relates to an improved method and apparatus for recording chromatographic peaks.

A conventional method for the determination of the concentration of constituents in a fluid mixture involves the use of a chromatographic analyzer. In chromatography, a sample of the fluid mixture to be analyzed is introduced into a column containing a selective sorbent or partitioning material. A carrier gas is directed into the column so as to force the sample material therethrough. The selective sorbent, or partitioning material, attempts to hold the constituents of the fluid mixture. This results in the several constituents of the fluid mixture flowing through the column at different rates of speed, depending upon their affinities for the packing material. The column effluent thus consists initially of the carrier gas alone, the individual constituents of the fluid mixture appearing later at spaced time intervals. A conventional method of detecting the presence and concentration of these constituents is to employ a thermal conductivity detector which compares the thermal conductivity of the column effluent gas with the thermal conductivity of the carrier gas directed to the column.

Conventionally, a thermal conductivity detector provides an output electrical signal which is recorded upon a chart with the various constituents of the sample mixture recorded as chromatographic peaks. The area beneath each of the individual chromatographic peaks is representative of the concentration of a particular constituent or constituents in the sample mixture directed to the chromatographic column. If the sample mixture directed to the chromatographic column contains various members of several homologous series, it becomes exceedingly difficult to identify individual components on the basis of spacing on the resulting produced chromatogram. In would thus become desirable to produce a chromatogram as a result of a chromatographic analysis wherein the distances between the chromatographic peaks or consecutive members of a homologous series on the produced chart are equal. Identification of the peaks would thus be simplified as chromatographic peaks having equal spacing or multiples of equal spacing belong to the same homologous series.

Accordingly, an object of our invention is to provide an improved chromatographic method and apparatus therefor.

Another object of our invention is to provide a chromatographic method of analysis and apparatus therefor wherein the chromatographic peaks of consecutive members of the same homologous series are equally spaced.

Another object of our invention is to provide a chromatographic method and apparatus therefor wherein chromatographic peaks representative of consecutive members of the same homologous series are equally spaced in the produced chromatogram and wherein chromatographic peaks of the same homologous series have been shifted.

Other objects, advantages and features of our invention will be readily apparent to those skilled in the art from the following description, the drawings and appended claims.

A better understanding of the invention can be obtained by referring to the drawings and following discussion.

In the drawings,

FIGURE 2 is representative of a conventionally produced chromatogram.

FIGURE 3 is illustrative of a chromatogram produced by the invention in the analysis of the fluid mixture of FIGURE 2.

FIGURES 4a and 4b are illustrative of a second embodiment of the invention wherein chromatographic peaks representative of consecutive members of two homologous series are evenly spaced, wherein corresponding members of the two homologous series are evenly spaced, and wherein chromatographic peaks of one homologous series have been shifted.

Figure 1:
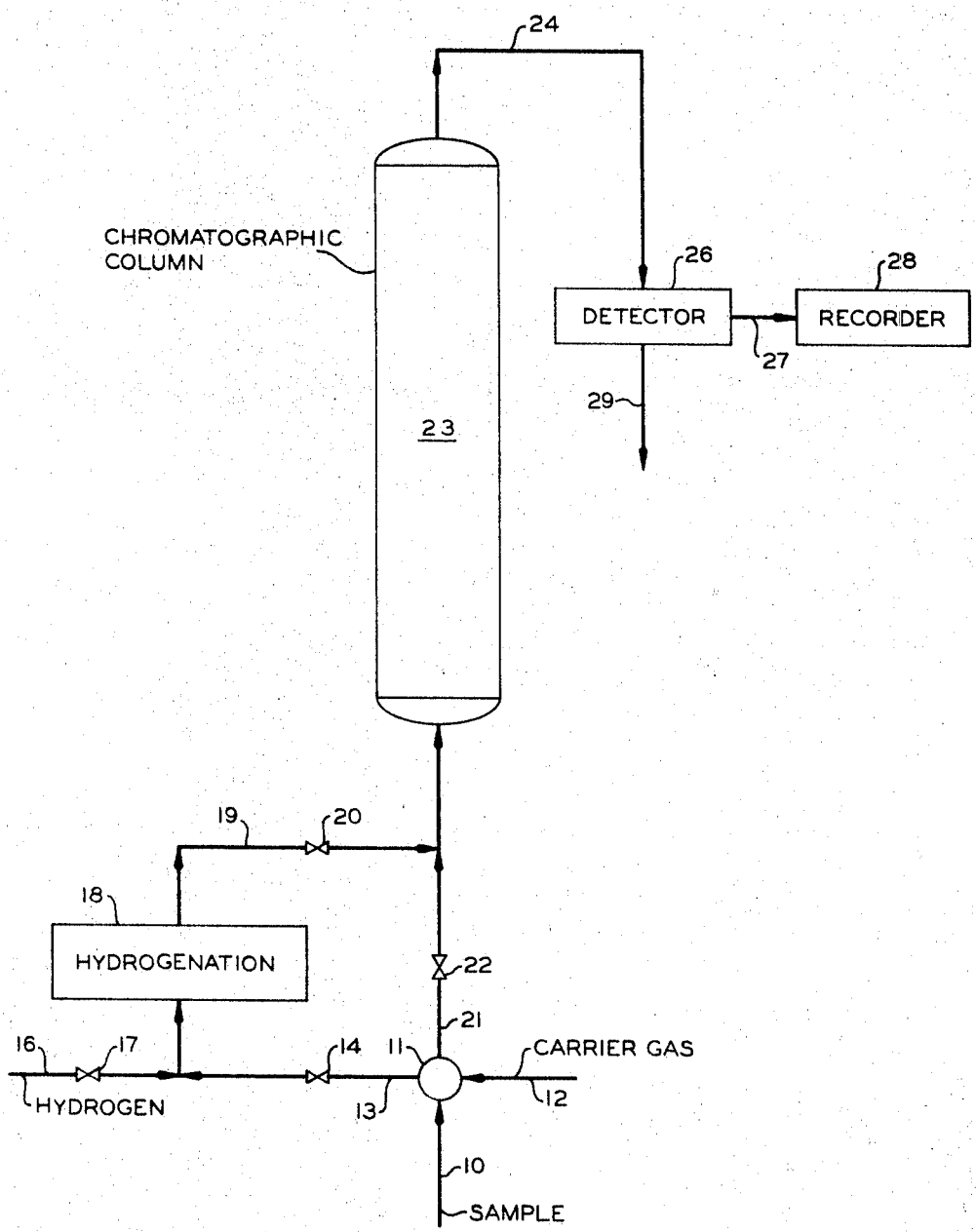
FIGURE 1 is a schematic representation of one embodiment of the invention.

Referring to FIGURE 1, a sample fluid mixture is introduced via conduit means 10 to a conventional sampling valve means 11. A carrier gas such as nitrogen or helium and which is inert to the subsequent chromatographic analysis is passed via conduit means 12 to sample valve means 11. A vaporous mixture comprising carrier gas and fluid sample is passed via conduit means 21 and valve means 22 to a chromatographic column 23 containing a material that selectively retards the passage therethrough of the constituents of the sample fluid mixture. An effluent vaporous mixture is withdrawn from chromatographic column 23 via conduit means 24 and passed to a conventional detector 26.

Detector 26 is adapted to measure a property of the sample fluid mixture directed thereto, which property is representative of the composition of the fluid mixture. Detector 26 can be a thermal conductivity cell which includes a temperature sensitive resistance element disposed in the path of fluid flow. A reference element, not shown, can be disposed in the carrier gas flow. The temperature differential between the resistance elements representative of the difference in thermal conductivity of the column effluent and the carrier gas can be measured by an electrical bridge circuit, such as a Wheatstone bridge. Detector 26 can also be any other type of apparatus shown in the art for measuring a property of a gaseous stream representative of the composition thereof.

A signal representative of the composition of the fluid mixture directed to detector 26 is passed via conduit means 27 to a hereafter described recorder 28. The column effluent is vented from detector 26 via conduit means 29.

When eluted from a chromatographic column operated isothermally, members of the same homologous series are eluted from the column in agreement with the equation:

$$\text{Log } (t_n - t_a) = An + B$$

where $t_n$ is the retention time for the member of the series containing $n$ carbon atoms, $t_a$ is the residence time of a non-absorbed gas such as air, and A and B are constants. Using a conventional recorder having a constant chart speed, analysis of a mixture consisting of consecutive members of the normal paraffins and 1-olefins appears as illustrated in FIGURE 2.

Referring to FIGURE 2, if the mixture analyzed contains various members of several homologous series, it becomes exceedingly difficult to identify components on the basis of the produced chromatogram. If, however, the chart speed of the recorder is programmed so that the distances between the chromatographic peaks for consecutive members of the series on the chart are equal, identification is simplified as the peaks having equal spacing or multiples of equal spacing are members of the same homologous series. Under these conditions, the resulting chromatogram for the sample fluid mixture of FIGURE 2 would appear as illustrated in FIGURE 3.

Recorder 28 as employed in our invention comprises a recording chart and means for programming the chart speed so that the distances between the peaks for consecutive members of the same homologous series on the produced chart are equal. For a strip chart recorder such as the Speedomax H, distributed by Leeds and Northup of Philadelphia, Pa., the chart speed should be $$S = \frac{a}{t+b} + c$$

where S is the chart speed, $t$ is the time after sample injection into the chromatographic column and $a$, $b$ and $c$ are constants to permit adjustments on initial chart speed, slight non-linearities in elution times, etc. The chart speed can be programmed empirically by introducing a fluid sample of known composition and containing only constituents of the same homologous series to chromatographic column 23. Recorder 28 can be provided with a gear train means for driving the recorder chart responsive to the aforementioned equation. Position of the chart gear, starting time for rotation of gear after sample injection, and speed of gear rotation are parameters adjusted to provide, respectively, constants $a$, $b$ and $c$.

With an X–Y recorder such as the 1100–E Variplotter, Model 99.412, distributed by Electronic Associates, Inc., Long Branch, N.J., requiring a voltage for the time (abscissa), scale, the voltage should be $$e = a' \log \frac{t+b'}{b'} + c't$$

where $e$ is the voltage, $t$ is the time after sample injection and $a'$, $b'$ and $c'$ are adjustable parameters determinable as described in the discussion of the strip chart recorder.

The combination of a programmed-chart-drive recorder with a conventional chromatographic apparatus and a means for converting specific volatile components of a sample mixture into volatile derivatives can provide an improved analysis system. FIGURES 1, 4a and 4b illustrate this embodiment of the invention as applied to the analysis of a hydrocarbon mixture of paraffins and olefins.

Referring to FIGURE 1, in the practice of this second embodiment, a sample fluid mixture is passed via conduit means 10 to sample valve means 11. A carrier gas is passed via conduit means 12 to sample valve means 11. A vaporous mixture of carrier gas and fluid mixture is passed via conduit means 13 and valve means 14 to a hydrogenation zone 18. Hydrogen is introduced via conduit means 16, valve means 17 and conduit means 13 into hydrogenation zone 18.

Within hydrogenation zone 18, the olefins contained within the sample fluid mixture are hydrogenated to the corresponding paraffins by the maintenance of conventional hydrogenation conditions within hydrogenation zone 18. An effluent mixture is withdrawn from hydrogenation zone 18 via conduit means 19 and passed via valve means 20 and conduit means 21 to chromatographic column 23 wherein separation of the effluent mixture is obtained.

An effluent mixture is withdrawn from chromatographic column 23 via conduit means 24 and passed to detector 26. A signal representative of the composition of the effluent mixture is passed from detector 26 via conduit means 27 to the previously described programmed-chart-drive recorder 28. The resulting chromatogram produced is illustrated in FIGURE 4b.

FIGURE 4a is illustrative of the chromatogram produced when the sample fluid mixture is passed from sample valve means 11 via conduit means 21 and valve means 22 directly to chromatographic column 23, by-passing hydrogenation zone 18. A comparison of the chromatograms produced in FIGURES 4a and 4b provide considerable qualitative information with respect to the composition of the sample fluid mixture. Under analysis conditions disclosed equal peak shift values correspond to members of the same homologous series.

Although a hydrogenation zone 18 has been illustrated in FIGURE 1, it is within the scope of this invention to employ other reaction zones for conversion of a portion of the sample fluid mixture, such as halogenation or hydrohalogenation zone wherein conventionally controlled conditions are employed to convert a portion of the sample fluid mixture to members of the same homologous series as a constituent or constituents of the remainder of the sample fluid mixture.

As will be evident to those skilled in the art, various modifications of this invention can be made, or followed, in the light of the foregoing disclosure, without departing from the spirit or scope thereof.

We claim:

1. A method of analysis which comprises introducing an organic fluid mixture which contains members of a first and a second homologous series into a conversion zone, maintaining conditions within said conversion zone so as to convert members of said second homologous series into members of said first homologous series, withdrawing an effluent mixture from said conversion zone, introducing at least a portion of said effluent mixture as a vapor into a chromatographic zone containing a material that selectively retards the passage therethrough of the constituents of said effluent mixture, measuring a property of the effluent withdrawn from said chromatographic zone which is representative of the composition thereof and establishing a signal which is representative of the measured property, recording on a chart the established signal, and moving the chart at a predetermined varying speed such that the resulting recorded peaks which are representative of consecutive members of said first homologous series appear at equally spaced intervals on said recording chart.

2. The method of claim 1 wherein said first homologous series a paraffinic series and said second homologous series is an olefinic series.

3. The method of claim 2 wheerin said conversion zone is a hydrogenation zone.

(References on following page)

References Cited

UNITED STATES PATENTS

| | | | |
|---|---|---|---|
| 3,063,051 | 11/1962 | Palm | 346—33 |
| 3,286,530 | 11/1966 | Ayers | 73—432 |
| 3,247,702 | 4/1966 | Houser et al. | 73—1 |

OTHER REFERENCES

Gas Chromatography 1964 ed., A. Goldup, The Elsevier Publishing Co., Amsterdam, 1965, p. 331.

"Apparatus Combination Analysis Gasoline," 142nd ACS National Meeting, by Lindeman, Chem. & Engr. News, Sept. 17, 1962, p. 61.

Mounts et al.: Analytical Chemistry, vol. 37, No. 6, May 1965, pp. 641–643.

RICHARD C. QUEISSER, *Primary Examiner.*

VICTOR J. TOTH, *Assistant Examiner.*

U.S. Cl. X.R.

23—232